INVENTOR
KENNETH R. SHOULDERS
BY Samuel Lindenberg
ATTORNEY

INVENTOR
KENNETH R. SHOULDERS
BY Samuel Lindenberg
ATTORNEY

Feb. 25, 1969 K. R. SHOULDERS 3,430,213

DATA STORAGE AND LOGIC DEVICE

Filed Jan. 22, 1965 Sheet 3 of 3

INVENTOR
KENNETH R. SHOULDERS
BY Samuel Lindenberg
ATTORNEY

United States Patent Office 3,430,213

Patented Feb. 25, 1969

3,430,213

DATA STORAGE AND LOGIC DEVICE

Kenneth R. Shoulders, Woodside, Calif., assignor to Stanford Research Institute, Menlo Park, Calif., a corporation of California Filed Jan. 22, 1965, Ser. No. 427,229

U.S. Cl. 340—173 10 Claims

Int. Cl. G11b 9/08; H01j 31/58

ABSTRACT OF THE DISCLOSURE

A data storage device comprises a tube having a storage target comprising a substrate upon which there is deposited in sequence, a first metal layer, a first dielectric layer, a second metal layer, a second dielectric layer and a third metal layer. An array of holes is provided each of which extends from the third metal layer down to the first metal layer. An electrical isolated metal ring is deposited within each hole and is supported on the second dielectric layer. The various metal layers are properly biased. The energy is an electron beam used to bombard the third metal layer in the region of a ring which determines whether the ring potential is near the third or first metal layer potentials. For read out the hole is directly bombarded by electrons. Whether or not secondary electrons are emitted is determined by the potential state of the washer.

This invention relates to data storage devices and more particularly to improvements therein.

An object of this invention is the provision of a novel and useful data storage system.

Still another object of the present invention is the provision of a data storage system capable of high-density storage.

Yet another object of the present invention is the provision of a data processing system in which useful logic can be performed by sets of data storage elements on other sets of data storage elements, either sequentially or simultaneously, with electron beams performing the transmitting function between sets.

These and other objects of the present invention may be obtained in a storage device including a multistorage element target comprising a substrate having a first metal layer deposited thereon. A first dielectric layer is deposited on the first metal layer. A second metal layer is deposited on the first dielectric layer. A second dielectric layer is deposited on the second metal layer. A third metal layer is deposited on the second dielectric layer. An array of holes exist in the target, each of which extends from the third metal layer down to the first metal layer. In each hole an electrically isolated metal ring is deposited which is supported in the second dielectric layer between the second and third metal layers. The described structure at each hole constitutes a single element of the target.

Bias voltages are applied to the first, second and third metal layers so that the third metal layer is positive with respect to the first metal layer and the second metal layer is negative with respect to the first metal layer. When an electron beam is permitted to bombard the third metal layer in the region adjacent to any of the holes with appropriate high energy, the beam can penetrate through the third metal layer and the isolated metal ring to the second metal layer. By reason of bombardment-induced conductivity the metal ring will assume a potential intermediate between that of the third (positive) and second (negative) metal layers, the value of which is dependent on and controlled by the values of bias voltages and the geometric parameters of the structure, such as dielectric and metal film thicknesses. The same purpose can be accomplished alternatively by bombarding with an electron energy sufficient to penetrate to the first metal layer. Upon removal of the cathode ray beam, the storage ring will maintain this potential since it is insulatingly supported within the dielectric film. If on the other hand, the region around a hole is bombarded with a lower beam energy sufficient to establish bombardment-induced conductivity between the third metal layer and the storage ring, but not between the second and third metal layers, then the potential of the ring is set to that of the third metal film or layer.

It can now be appreciated that the metal ring or washer can be set to one or the other of the potentials applied to the top and bottom metal films. Effectively, therefore, the described structure around each hole can store binary information. In order to read out the information which is stored at any hole, an electron beam is directed at the face of a hole with sufficient energy to cause secondary electrons to be emitted from the bottom metal layer, but with insufficient energy to cause bombardment-induced conductivity between any pair of metal layers. Whether or not these emitted secondaries will get out of the hole is determined, however, by the potential of the storage washer. When the storage washer potential is close to that of a third metal layer or the surface layer, it is sufficiently positive to compensate for the negative bias on the second metal layer and the secondary emission is aeccelerated out of the hole. The emergent secondary emission can be focussed into a narrow beam perpendicular to the target surface or diverted toward the edges of the target as desired, by suitably selecting the bias potentials. When the potential of the storage washer is close to that of the base metal layer and the secondary emission is accelerated layer is dominant, and the secondary emission is reduced so that substantially no secondary electrons are emitted from the hole. With the bias voltages set to divert emergent secondary electrons, one or more electron multipliers positioned at the sides of the storage target are employed for detecting whether the hole under bombardment is emitting or not, thereby indicating which of the two potentials or binary states to which the washer of that hole had previously been set.

The setting or storing of states on all of the storage elements of the target can be done sequentially. Subsequent reading out of the information can also be done sequentially.

In another arrangement of this invention, two targets of the type described are spaced opposite one another and suitable deflecting and focussing electrodes are placed therebetween. Provision is made for storing and reading out data in one or both of the storage targets by suitably located electron guns. Provision is also made for beaming and utilizing the emergent secondary electrons from either target as the source for storing information on the other target. In one mode of operation, information regarding the state stored at any desired element in one target can be transmitted to any desired element in the other target and stored there in direct or binary complementary form. In another mode of operation, the foregoing method of information transmittal from either target can be used combinationally to perform a complete set of logical operations, the results of which are automatically stored on the receptor target. In still another mode of operation, information stored on any size area of one target containing more than one storage element can be transmitted simultaneously to and combined logically at a similar area configuration on the other target.

The novel features that are considered characteristic of this invention are set forth with particularly in the appended claims. The invention itself both as to its organization and method of operation, as well as additional objects and advantages thereof, will best be understood from the following description when read in connection with the accompanying drawings, in which:

Figure 1:
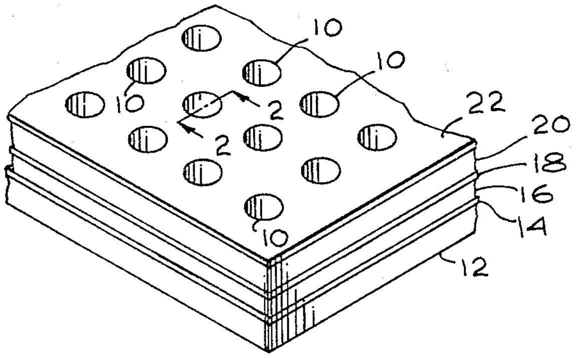
FIGURE 1 is a sectional view illustrating the appearance of a storage target in accordance with this invention.
Figure 2:
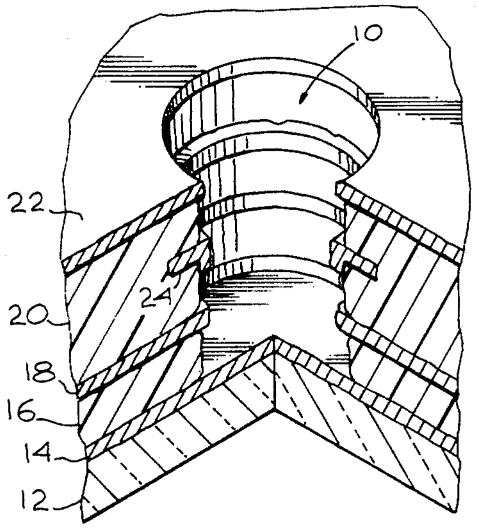
FIGURE 2 is an isometric view of a cross-section of an aperture storage region of the storage target.

FIGURE 1 is a fragment of a data storage target in accordance with this invention and FIGURE 2 is an isometric cross-sectional view of a storage element of the target. The target shown in FIGURE 1 is effectively a sandwich of alternate metal and dielectric layers which has a plurality of holes 10 therein arranged in columns and rows as desired. As will become more clear from the description that follows, each one of these holes delineates a different storage region. Thus, the storage regions may be referred to as aperture storage regions. The target comprises a substrate 12 upon which there is deposited a first metal film or layer 14, of a metal such as molybdenum. A first dielectric material 16 is next deposited upon the first metal layer 14. A second metal layer 18 which may be the same metal as the first metal layer 14, is next deposited on the dielectric layer 16. A second dielectric layer 20 is then deposited upon the metal layer 18. A third metal layer 22 or top metal layer is then deposited upon the second dielectric layer 20. The dielectric layer 16 and 18 may be of a material such as aluminum oxide. The third metal layer may also be molybdenum.

Each one of the holes 10 extends through the third and second metal layers and second and first dielectric layers down to the first metal layer 14. As may be more clearly seen in FIGURE 2, a metal ring or washer 24 is held in the second dielectric layer between the second and third metal layers. The metal washer 24 is also designated as a storage ring. It is the key element in the operation of the storage system. Its function is to control the emission of secondary electrons from the metal film which is at the base of the holes 10 which constitutes a first metal layer.

Figure 3:
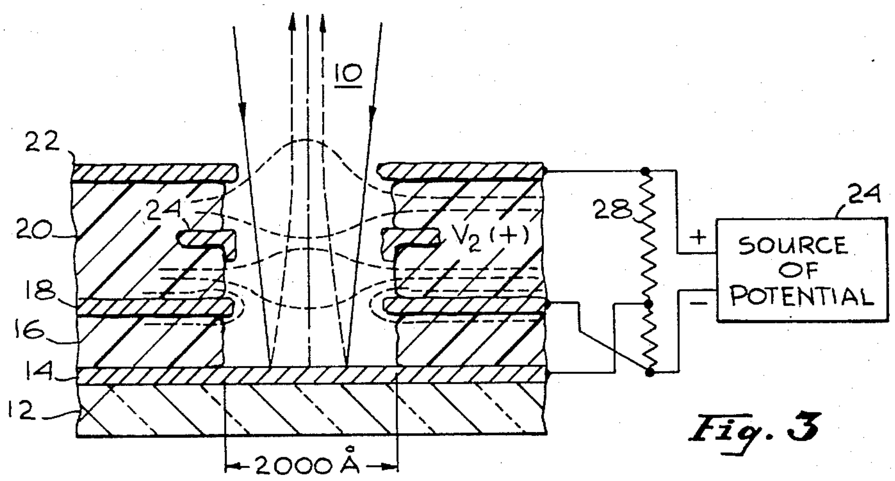
FIGURE 3 illustrates schematically a cross-section of a storage element of the target shown in FIGURE 1, as well as secondary electron paths when the storage element is respectively storing a one binary bit and a zero binary bit.

Referring now to FIGURE 3 which is a schematic of an aperture storage region, such as shown in FIGURE 2, a source of operating potential 26 is connected across the outer ends of a voltage divider 28. The ends of the voltage divider are respectively connected to the third film layer 22 and second film layer 18 in a manner so that the third film layer 22 is positive and the second film layer 18 is negative relative thereto. It will be appreciated that separate power supplies may be used in place of the voltage divider, if desired. The first metal film layer is connected to a tapping point on the voltage divider 28 in a manner so that it is negative relative to the third film layer, but positive relative to the second film layer.

In order to store binary data in the storage ring, the phenomenon of bombardment-induced conductivity is utilized. Thus, for example, if the region around an opening 10 which includes a storage washer 24 is bombarded by an electron beam having a sufficient energy (on the order of 4,000 volts, for example) then penetration of the target to the second metal layer occurs with the result that the local conductance ratio of the two regions of the dielectric film 20 between the washer and metal layers 18 and 22 sets the washer to substantially the potential of the first film layer 14. If the beam energy is at an appropriately lower value (on the order of 2,000 volts, for example) it will penetrate dielectric layer 20 only as far as the washer, thereby inducing high conductance only in the affected region. The washer will therefore assume the potential of the surface metal layer 22. Removal of the electron beam leaves the storage washer at the potential to which it has been brought by the beam. It should, therefore, be appreciated that the potential of the storage washer may be made to represent binary data.

Figure 4:
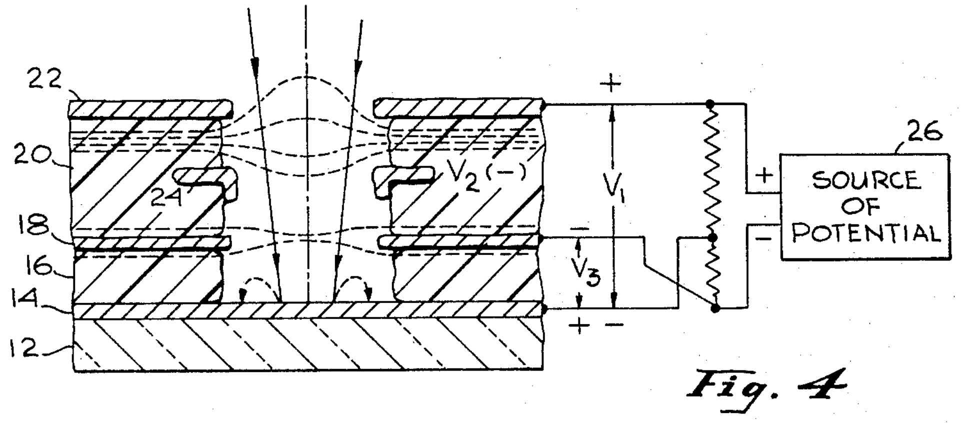
FIGURE 4 is a schematic view illustrating the appearance of a storage tube having a target structure in accordance with this invention.

In order to read out the binary state that has been stored at a storage washer, an electron beam is employed (on the order of 1 kilovolt) to bombard the base of the hole encompassed by the storage ring, with sufficient energy to liberate secondary electrons therefrom, but not high enough to cause bombardment-induced conductivity in the dielectric. If the storage washer is in its positive voltage state then, as may be seen in FIGURE 3, the field produced by the storage washer and the upper metal film 22 accelerates the secondary electrons out of the hole and converses them into a beam. Should the storage ring be in its base or zero state, as shown in FIGURE 4, then the field established thereby together with the field of the second metal film is sufficient to prevent the secondary electrons from leaving the hole. For clarity, the state for which secondary electrons can emerge from a storage aperture is arbitrarily designated as the "one" state, and the state for which secondary electrons cannot emerge is called the "zero" state.

The state of a storage washer is automatically regenerated by the reading process since, some of the secondary electrons produced at the first metal film by the reading electron beam will strike the washer with a velocity greater than the unity emission point if the washer is positive and below the unity emission point if the washer is substantially at the potential of the base or first metal film, thereby tending to maintain the washer at whatever potential it has at the time. Without reading or other electron illumination, the charge on the washer will persist for a considerable period of time. However, a flood illumination of the entire storage target with a very low current density beam can be used to continuously regenerate the information stored in the various storage cells of a target array.

Figure 5:
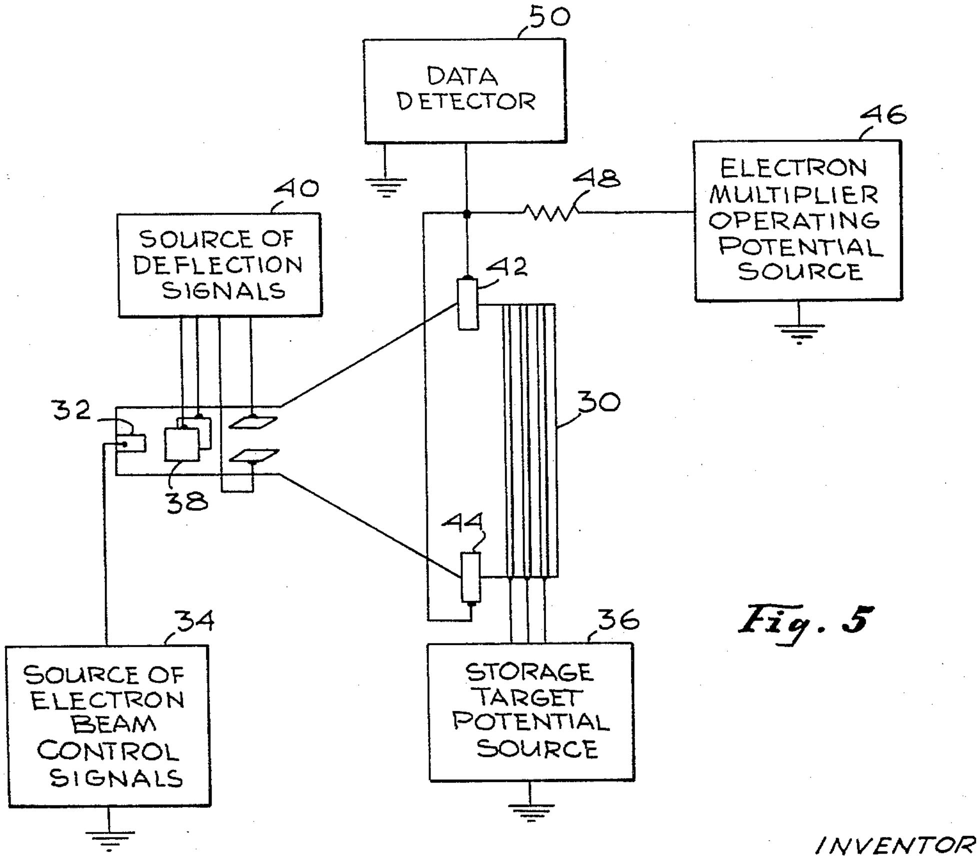
FIGURE 5 illustrates a data processing arrangement utilizing data storage targets in accordance with this invention.

FIGURE 5 illustrates the appearance of a storage tube in accordance with this invention. A storage target 30 constructed as has been described previously occupies one end of a tube envelope and a cathode ray beam source 32 occupies the other end of the tube envelope. The source of electron beam control signals 32 determines the energy with which the electron beam from the source 32 will strike the target 30. The storage target potential source 36 provides the required biasing potentials to the various layers of the storage target 30. A set of deflection electrodes 38 which have applied thereto deflection signals from a source 40, determine the location at which a cathode ray beam from the source 32 will strike the target 30. Electrons which are emitted from the storage apertures are collected by one or more electron multiplier devices respectively 42, 44, which are positioned adjacent the outer edge of the storage target. These electron multipliers may be connected in parallel and to a source of operating potential 46 through a load resistor 48. The data which has been read out is detected by a data detector 50, which may be any device responsive to the presence or absence of a signal across the resistor 48 when a particular storage aperture region of the target is being bombarded.

Figure 6:
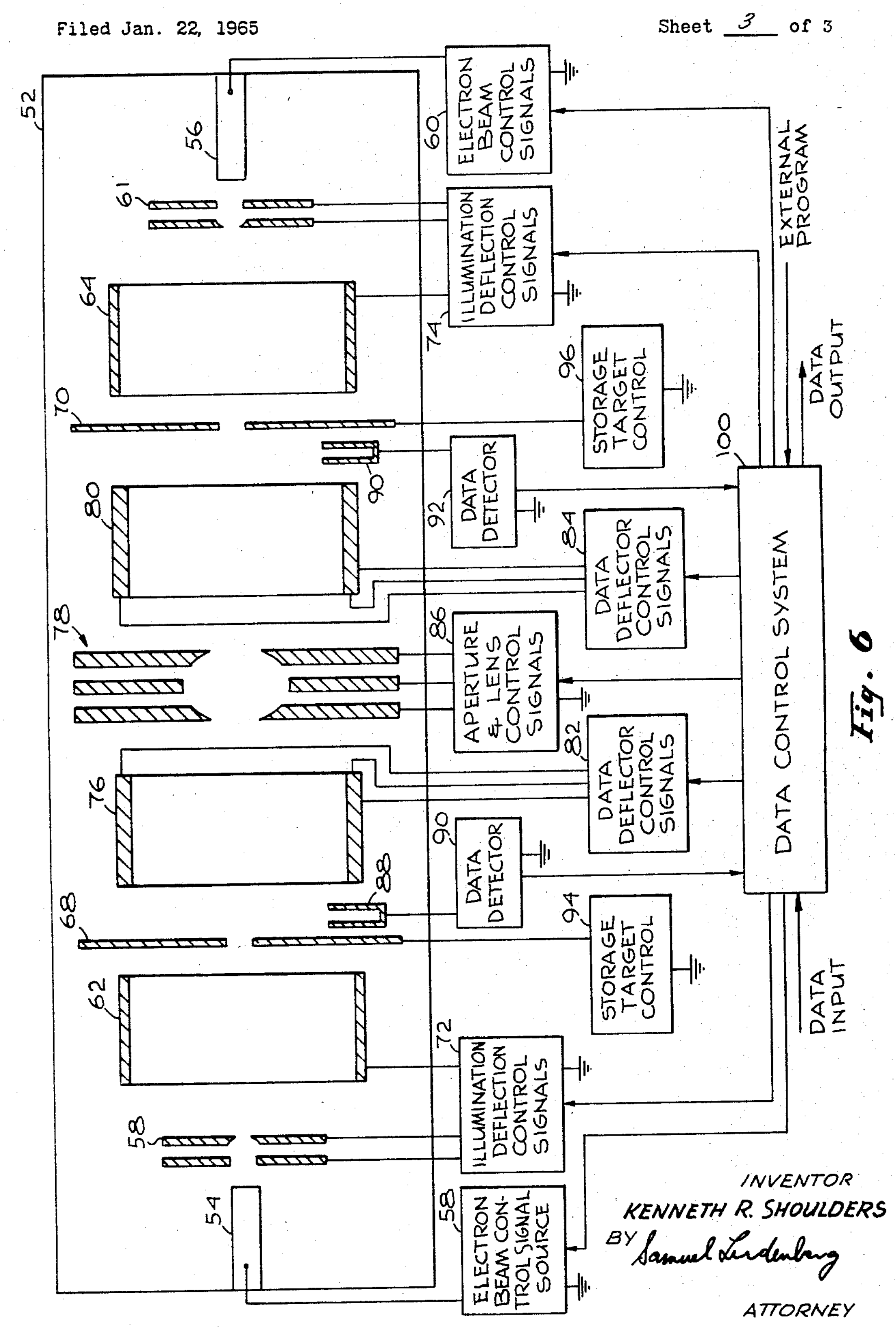

FIGURE 6 is a schematic representation of an electron beam data processing device which employs two data storage targets which are made in accordance with this invention. The envelope 52 contains, at both ends, electron beam generating structures respectively 54, 56. These are controlled by the respective electron beam control signal sources respectively 58, 60. The area of a target which an electron beam can illuminate, whether a single storage aperture region or the entire target, is determined by the potential supplied to the respective illumination control electrodes respectively 58, 61 through which the electron beam passes after being emitted from the electron guns respectively 54, 56. Thereafter, the emitted electron beams from guns 54, 56 are directed through apertures in two data storage targets 68, 70, through the elements 78 of an electron lens, toward the respective opposite targets. The illumination determining electrodes respectively 62, 64 respectively receive their signals from illumination deflector control signal sources respectively 72, 74.

Illumination deflector 62 and a set of data deflector electrodes 76, positioned on the opposite sides of target 68, are operated together to direct the electron beam from gun 54 through the electron lens structure 78 with minimum aberration to any desired storage element on target 70. Simultaneously, the electron lens structure 78 and the data deflector electrodes 76 can be made to act together to direct any secondary electron beam from an illuminated storage element on target 70 to any desired storage element on target 68. In this mode of operation, electron gun 56, illumination deflector 64, and data deflector 70 are not operated. Similarly, illumination deflector 64 and a set of data deflector electrodes 80 may be operated together to direct the electron beam from gun 56 through the electron lens 78 to any desired storage element on target 68. Electron lens 78 and data deflectors 80 can be made to act together to direct an electron beam from any storage element on target 68 to any storage element on target 70.

The data deflector electrodes receive their control signals from a data deflector control signal source 82. The data deflector electrodes receive their control signals from the data deflector control signal source 84. The lens and aperture electrodes 78 are under control of an aperture lens control signal source 86.

When it is desired to read the data stored in the target 68, the secondary electrons which are emitted from any particular aperture storage region on that target are collected by an electron multiplier 88 which is connected to data detector apparatus 90. Similarly, when it is desired to read from the target 70, the secondary electrons emitted from a particular aperture storage region are collected by the electron multiplier 90 which applies its output to a data detector 92.

It should be appreciated that the techniques for directing or controlling an electron beam, the structures for which have been shown schematically and described functionally in connection with FIGURE 6, are techniques which are known and practiced in the art within which this invention falls. However, it is believed that the combination of electron beam controlling structures together with the data storage targets is a novel and unique organization.

The bias sources for the respective storage targets 68, 70 are supplied by storage target bias sources respectively 94, 96.

Signals for controlling the respective electron beam control signal sources, illumination deflector control signals, data control signals and aperture and lens control signals, are provided by a data control system 100 which receives data input and external program signals and which provides data output signals. The data control system also provides the necessary instructions to the various electrode control signal sources, in response to the input signals thereto, for the purpose of performing logic with the electron beam data processing structure which has been described. It should be clear at this point that binary data can be entered into and subsequently read out of one or both of the data storage targets 68, 70 by appropriately programming the energy of the respective target illuminating electron beams. Data can be read out of any area of either storage target and can be transferred, by applying proper control signals to the data deflector electrodes and lens and aperture electrodes to be stored in a particular storage region of the other target. It should be appreciated that when an aperture storage region on one of the targets is in its one state, i.e. can emit secondary electrons, the potential between the two targets can be set to accelerate the secondary electrons so that when they impinge upon a predetermined aperture storage region in the other target, they have the energy required to store, by choice, either a one or a zero in that aperture region, regardless of what state was stored there previously.

It is now shown that the foregoing modes of operation permit the performance of binary logical operations at the storage elements. By way of example, but not meant to be restrictive, four logical operations are now described, which form a complete logical set, from which it can be deduced mathematically that all binary functions of two variables can be formed, stored, and read out, as desired, by appropriate sequences of the four basic operations.

For this purpose, one of the targets will be called the transmitting target and the other the receiving target. Assume now that the letter T represents the binary state stored at any λ storage element in the transmitting target. Also, let the letter R represent the binary state stored at any element in the receiving target before the desired logical operation is performed on it, and let R represent the binary state of the same element in the receiving target after the logical operation is performed. The operation itself is performed by illuminating the element on the transmitting target with a reading beam from its electrical gun, and imaging the emerging secondary electrons, if any, onto the element in the receiving target by means of suitable potentials on the electron lens and deflecting systems. The nature of the logical operation performed is selected by adjusting the potential difference between the two targets.

To perform one of the basic logical operations, the voltage of the receiving target is made more positive than that of the transmitting target so as to accelerate secondary electrons emitted by the transmitted target by the amount required for writing the one state on the receiving target (approximately 2 kilovolts).

It is now clear that if T is in its zero state, then the operation above does not alter the initial state of R. This result is shown in the first two lines of Table I below, which represents the Truth Table for this logical operation. The last two lines of Table I are the results of this operation for the condition that T is in its one state, for which a one will be written at the receiving element regardless of its previous state, i.e. $R^*=1$ for either $R=1$ or $R=0$. The complete Truth Table indicates that the result R* obtained by this operation is the logical "Or" function of the two binary variables represented by T and R.

TABLE I

| T | R | R* |
|---|---|---|
| 0 | 0 | 0 |
| 0 | 1 | 1 |
| 1 | 0 | 1 |
| 1 | 1 | 1 |

Table II shown below is a Truth Table indicating the results that are obtained when the potential difference between the two targets is set so that secondary electrons are accelerated to the receiving target with sufficient energy to write the zero state (using 4 kilovolts). An "R and $\overline{T}$ function" is accomplished here where the symbol $\overline{T}$ represents the "NOT T" or complement function of T.

TABLE II

| T | R | R* |
|---|---|---|
| 0 | 0 | 0 |
| 0 | 1 | 1 |
| 1 | 0 | 0 |
| 1 | 1 | 0 |

The other two operations of the set are simple transfer operations with and without complementation. Thus, by presetting the preceding target R to one and by accelerating any secondaries from the transmitting target T with a 4 kilovolt energy, the final state R* will equal $\overline{T}$. By presetting R to zero and accelerating secondaries from the target to T with a 2 kilovolt energy, the final state R* will equal T.

It can be shown that all binary functions of two variables can be performed by utilizing appropriate sequences of the four operations shown above.

Functions of more than two binary variables can be obtained. For example, the data stored at any two elements in the transmitting target (or their complements) can be transmitted sequentially, to any desired element in the receiving element. Letting the symbols $T_1$ and $T_2$ represent the states of the two transmitting elements, and R and R* the intial and final states of the receiving element, then the data produced and stored, represented by R*, constitute the class of functions of the three variable $R_1$, $T_1$, and $T_2$, the various functions being selected by the operator by presetting or not persetting R, by the order of transfer to R from $T_1$ and $T_2$, and by whether neither, either, or both $T_1$ and $T_2$ are transferred to R in complementary form.

All opertions and functions described for individual elements can be carried out for large parallel arrays of elements provided that each operation involved at any time is the same for all elements. Initially, all information is scanned into the machine sequentially. Once the pattern is in the machine it may be transferred in parallel fashion as many times as necessary to arbitrary areas on either active surface. Instead of transferring the pattern in the original form, it is possible to transfer its complement. Transfer operations incorporating a change of scale magnifications are also possible.

It should be apparent that the data processing machine described is useful as a general purpose computer, provided that a small amount of attendant external apparatus is supplied for deflection and pulse regulation of various potentials. Instructions or commands for these potentials can be stored externally or obtained from control data which is stored on the targets themselves. Access to this information is gained sequentially by a scanning beam using an electron multiplier for read out.

There has accordingly been described and shown herein a novel, useful and unique data storage system which lends itself to the performance of logical operations of data. While the storage target has been described using three metal layers and a washer, it will be apparent to those skilled in the art that a target construction using two metal layers may be employed. This involves a top and bottom metal layer separated by a dielectric and having a plurality of holes. The holes extend through to the bottom layer. A metal washer is insulatingly supported by the dielectric between the two metal layers at each hole, in the same manner as described herein. This structure is to be considered within the scope of the teachings of this invention and the claims herein. However, the embodiment of the invention described using three metal layers is preferred in view of the fact that the suppression of secondary electrons in the two metal layer embodiment is not thought to be as effective when the washer potential is sought to be established at the potential of the bottom metal layer. This would render discrimination between the one and zero storage states more difficult.

What is claimed is:

1. A data storage target comprising a substrate having a sandwich structure deposited thereover, said sandwich structure including a top metal layer, a dielectric layer, a bottom metal layer, a plurality of dispersed holes in said sandwich, each hole extending through said top metal layer and dielectric layer to said bottom metal layer, and a plurality of metal washers, a different one of which is insulatingly supported within said dielectric layer at each of said holes with the inner edge of said washer exposed within each hole.

2. A data storage target comprising a substrate, a sandwich structure covering one side of said substrate, an array of holes within said sandwich structure, said sandwich structure comprising a first metal layer on said substrate, a first dielectric layer on said metal layer, a second metal layer on said first dielectric layer, a second dielectric layer on said second metal layer, a third metal layer on said second dielectric layer, each of said holes extending down to said first metal layer, and within each of said holes a metal washer insulatingly supported within each second dielectric layer, and having its inner edge exposed within said hole.

3. A data storage target comprising a first metal layer, a dielectric layer deposited on one surface of said first metal layer, a second metal layer deposited on the exposed surface of said first dielectric layer, a second dielectric layer deposited on the surface of said second metal layer, a third metal layer deposited on the surface of said second dielectric layer, a plurality of spaced apertures in said target each aperture extending through said third metal layer down to said first metal layer, and within each aperture a metal washer insulatingly supported by said second dielectric layer with the inner edge of said metal washer being exposed within the opening of an aperture.

4. A data storage device including a substate having a sandwich structure deposited thereover, said sandwich structure including a top metal layer, a dielectric layer, a bottom metal layer, a plurality of dispersed holes in said sandwich, each hole extending through said top metal layer and dielectric layer to said bottom metal layer, a plurality of metal washers, a different one of which is insulatingly supported within said dielectric layer at each of said holes with the inner edge of said washer exposed within each hole, means for generating a cathode ray beam, means for selectively bombarding a predetermined one of said target holes and the region surrounding said target hole with said cathode ray beam, and means for controlling the energy level of said cathode ray beam to have a first level to cause conduction substantially between said top layer, said metal washer and said bottom layer, to have a second level to cause conduction between said top layer and said metal washer, and to have a third level whereby substantially no conduction occurs.

5. A data storage device comprising a storage target having an array of apertures therethrough, a metal layer closing off one end of the apertures of said array, a storage washer for each aperture in said array, dielectric means for insulatingly supporting each washer substantially concentrically with each aperture with its inner edge exposed within each aperture, an upper metal layer insulatingly supported by said dielectric means at the other end of said plurality of apertures, said upper metal layer having a plurality of apertures therethrough coincident with said array of apertures in said storage target, means for applying bias voltages of relatively opposite polarities to said upper metal layer and bottom metal layer, and means for selectively bombarding one of said plurality of apertures with an electron beam having one energy level for establishing the metal washer within said aperture at substantially the potential of said bottom metal layer and with an electron beam of a second energy level for establishing said metal washer substantially at the potential of said top metal layer.

6. A data storage device comprising a target having a first metal layer, a dielectric layer covering said first metal layer, a second metal layer on said dielectric layer, a second dielectric layer covering said second metal layer, and a top metal layer covering said second dielectric layer, said target having a plurality of apertures therein, each of said apertures extending through said top metal layer, said second dielectric layer, said second metal layer and said first dielectric layer to said first metal layer, a plurality of metal washers, each of said metal washers being insulatingly supported within the second dielectric layer within each of said apertures, a source of bias voltages, means for applying a first, second and third bias voltage respectively from said source to said top metal layer, said second layer and said first metal layer, said first bias voltage being positive relative to said third bias voltage and said second bias voltage being negative relative to said third bias voltage, and means for selectively bombarding with an electron beam having a first energy level the region around one of said pluralities of apertures for establishing the metal washer within said aperture at substantially the voltage of said first metal layer and for bombarding with an electron beam having a second energy level for establishing said metal washer substantially at the potential of said top metal layer.

7. A storage device as recited in claim 6 wherein there is included a means for bombarding with an electron beam having a third energy level the first metal layer within a predetermined one of said apertures for deriving secondary electrons from said first metal layer which are emitted from said aperture when the metal washer within said aperture is at the potential of said first metal layer.

8. An electron beam data processing device comprising a first and a second data storage target each having a data storage surface and an aperture therethrough, said data storage targets being spaced apart and substantially parallel to one another with their aperture aligned and their storage surfaces facing one another, each said storage surface comprising an array of a plurailty of aperture storage regions, a first and second means for generating an electron beam positioned substantially in alignment with the aligned openings in said first and second storage targets and outside of the space enclosed between said first and second storage targets, first and second means for controlling the width of an electron beam generated by said respective first and second means for generating an electron beam, first and second means for selectively directing an electron beam at the aperture storage regions of said first and second storage targets respectively placed adjacent said first and second storage targets, and means for determining the energy of an electron beam traveling in the space between said two targets, for determining the data recorded in an aperture storage region responsive to said electron beam.

9. Apparatus as recited in claim 8 wherein said first and second storage targets each comprises a substrate, a sandwich structure covering one side of said substrate, an array of holes within said sandwich structure, said sandwich structure comprising a first metal layer on said substrate, a first dielectric layer on said metal layer, a second metal layer on said first dielectric layer, a second dielectric layer on said second metal layer, a third metal layer on said second dielectric layer, each of said holes extending down to said first metal layer, and within each of said holes a metal washer insulatingly supported within each second dielectric layer, and having its inner edge exposed within said hole.

10. An electron beam data processing device comprising a first and second data storage target each having a data storage surface, a back surface and an access aperture therethrough, said data storage targets being spaced apart substantially parallel to one another with their access apertures aligned and their storage surfaces facing one another, each said storage surface comprising an array of a plurality of aperture storage regions, a first and second means for generating an electron beam positioned respectively opposite the back surfaces of said respective first and second data storage targets and aligned with said access apertures, first and second means for controlling the width of an electron beam respectively placed between said first means for generating an electron beam and said first data storage target back surface and between said second means for generating an electron beam and said second data storage target back surface, first and second means for selectively directing an electron beam at the aperture storage regions of said respective first and second storage targets, said first and second means for selectively directing being respectively positioned adjacent said first and second data storage target front surfaces, electron beam lens means for focussing electron beams positioned between said first and second means for selectively directing an electron beam, means for biasing said first and second targets and said electron beam lens, means for determining the energy of an electron beam traveling in the space between said two targets at different predetermined energy levels to perform predetermined logical operations on data stored in an aperture storage region bombarded by said electron beam.

References Cited

UNITED STATES PATENTS 2,547,386 4/1951 Gray ---------------- 328—123

TERRELL W. FEARS, *Primary Examiner.*

U.S. Cl. X.R.

315—5.25, 5.37, 8.5; 328—124